Feb. 23, 1960
C. W. MUNDAY
2,926,253
RADIATION ANALYSIS
Filed Dec. 22, 1954
3 Sheets-Sheet 1
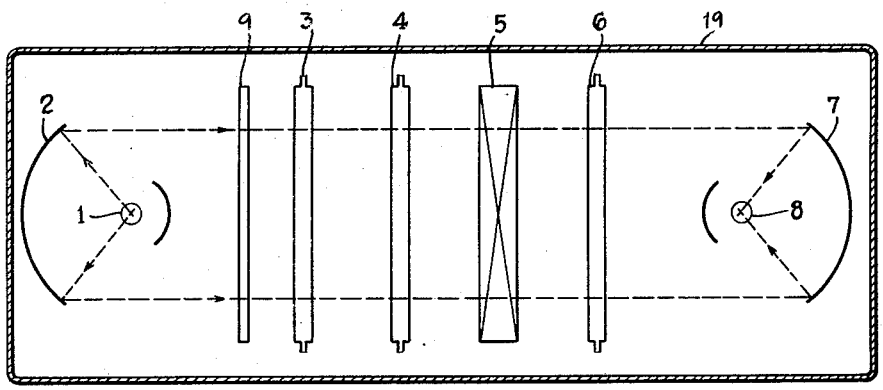
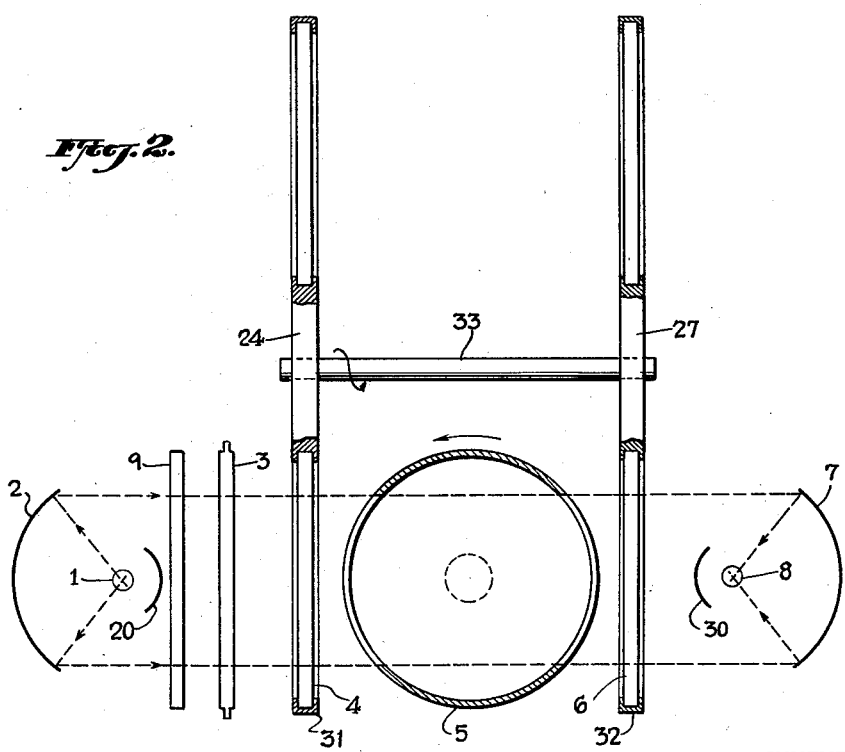
INVENTOR.
CHARLES WALTER MUNDAY.
BY
ATTORNEYS.

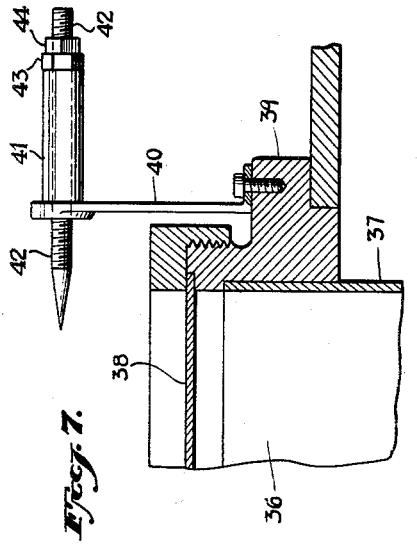
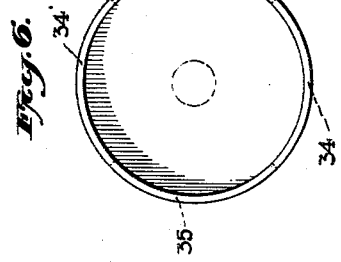
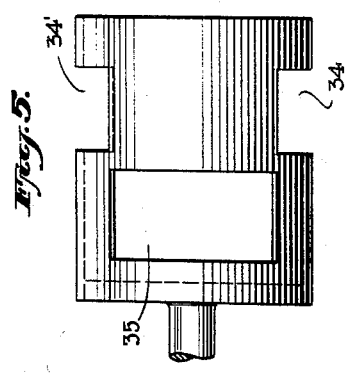
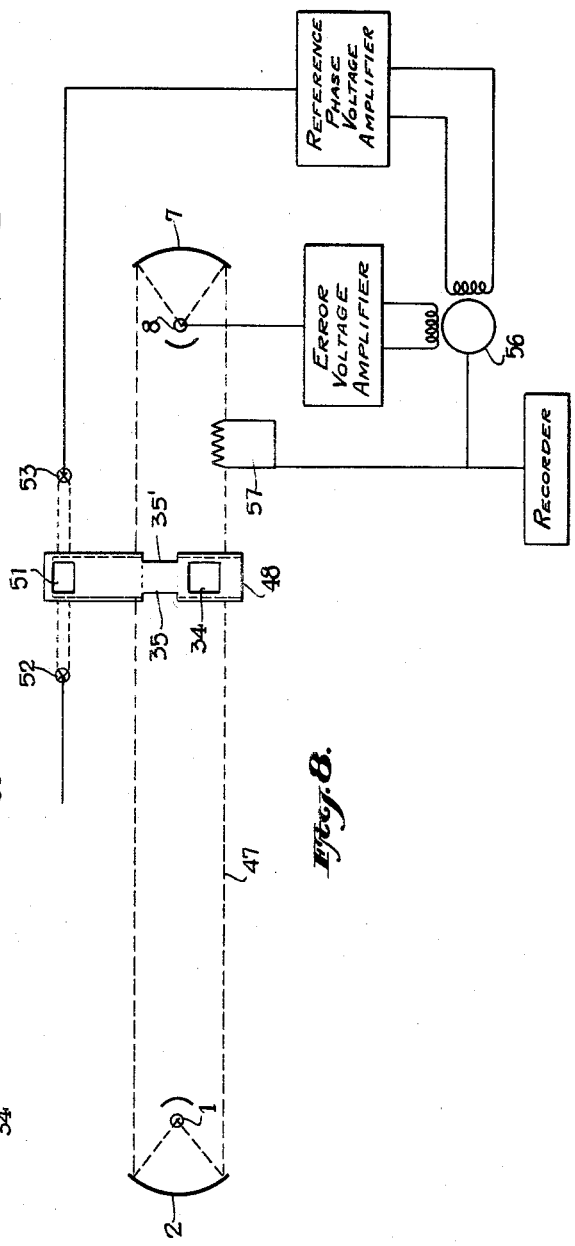

2,926,253
Patented Feb. 23, 1960

United States Patent Office

2,926,253
RADIATION ANALYSIS

Charles Walter Munday, London, England, assignor to The Distillers Company Limited, Edinburgh, Scotland, a British company Application December 22, 1954, Serial No. 476,933

7 Claims. (Cl. 250—43.5)

The present invention relates to an improved construction for an apparatus suitable for the analysis by infra-red radiation absorption of liquids.

The absorption of infra-red radiation, for instance radiation in the wave length range 3 to 50$\mu$, emitted by a conventional black body infra-red radiator at a suitable temperature, by liquids is in general more intense than the absorption by gases, with the result that in order to effect any measure of analysis of liquids it is necessary when employing the absorption bands in the fundamental region normally used, i.e. bands in the region of about 3$\mu$ to about 50$\mu$, to use cells for containing the liquid samples which are of small thickness, for example in the case of liquid hydrocarbons of a thickness of the order of about 0.1 mm. Consequently the construction and use of apparatus for the analysis by infra-red radiation absorption of liquids, particularly continuous analysis, presents serious difficulty.

It has now been found that the radiation analysis of liquids may be more simply effected by using infra-red radiation in the frequency range corresponding to the harmonics of the fundamental frequencies of which absorption is very much less intense, thus making possible the use of cells and filters of practicable size, for instance cells having an internal width of from 1 to 200 mm. and avoiding the difficulty of forcing a liquid under continuous analysis uniformly through very thin cells.

Accordingly, the present invention is for an infra-red radiation absorption liquid analyser which is characterised in that the apparatus includes a filter which transmits substantially only radiation in the range of wave lengths 0.8 to 2.7$\mu$, and a detector which responds in this wave length range.

The liquids which can be analysed by the apparatus of the present invention are those liquids which are reasonably transparent to radiation in the range of wave lengths 0.8 to 2.7$\mu$, and which possess one or more absorption bands in this range, and include liquid hydrocarbons, such as pentane, hexane and the like and liquid petroleum fractions; liquid compounds containing carbon, hydrogen and oxygen, such as acetone, ethyl alcohol, propyl alcohol and the like; water in solution in liquids reasonably transparent in the range 0.8 to 2.7$\mu$, for instance water in carbon disulphide, water in ethyl alcohol, water in phenol, water in acetone, water in liquid carbon dioxide, and water in carbon tetrachloride; and phenol dissolved in solvents such as carbon disulphide.

The exact type of filter employed will depend on the nature of the liquid to be analysed. The radiation analyser according to the present invention is particularly suitable for the analysis of liquid hydrocarbons, which absorb radiation in the wave length range 1.7 to 2.4$\mu$. For this purpose the use of a germanium layer filter of suitable thickness, for instance of a thickness of the order of 0.5 to 0.6$\mu$, which absorbs substantially all radiation below about 1.0$\mu$, combined with a glass filter (e.g. of soda glass), which absorbs radiation above about 3.5$\mu$, is preferred. The radiation analyser as described herein is also suitable for the estimation of small amounts of water in solvents such as acetone, ethyl alcohol, propyl alcohol and the like, the water having an absorption band at 960 m$\mu$. For this purpose it is preferred to use a multi-layer interference-type filter, designed to transmit only radiation in the frequency range 930 to 990 m$\mu$, combined with a glass filter. A multi-layer interference-type filter of this type is described in the Journal of the Optical Society of America, 1947, 37, 451 by L. N. Hadley et al.

The radiation detector employed will also depend on the nature of the liquid under analysis. Thus for the detection of wave lengths in the range 1.7 to 2.4$\mu$ (liquid hydrocarbons) a lead sulphide detector has been found to be most suitable, while for wave lengths of about 960 m$\mu$ an image converter combined with a photon-multiplier is advantageously used. A suitable image converter is described in Electronic Engineering, 1948, 20, 274. A photon-multiplier which may be employed in this application is for example, No. 931(a) described in the Radio Corporation of America Handbook, 1954. It is preferred to employ detectors which respond only in the wave length range in use, though detectors which also respond outside this range may also be used if desired. The detector should preferably peak (i.e. operate at maximum sensitivity) at or near the precise wave length range within which the liquids under analysis absorb radiation. Thus the lead sulphide detector peaks at about 2.2$\mu$. Other detectors which may also be used include phthalium sulphide detectors, which peak at 1.5$\mu$, and germanium photo-cells which peak at 1.6$\mu$.

It will be appreciated, however, that the invention is not limited to the use of any particular filter or detector, but only to the use of filters which transmit and detectors which respond in the wave length range 0.8 to 2.7$\mu$.

It is desirable that the radiation source should be operated at a temperature such that the wave length Nernst maximum lies in the particular wave length range being employed, e.g. 1.7 to 2.4$\mu$ in the case of liquid hydrocarbons.

It is also desirable that the cell windows are constructed of a material which complements or supplements the effect of the filter employed.

It is very desirable that the apparatus of the present invention be thermostatted, i.e. that the temperature of the apparatus be thermostatically controlled. This may be achieved by any of the standard means as, for example by enclosing the instrument in an insulated container with suitable thermostatting arrangements.

Various embodiments of the apparatus according to the present invention are shown solely by way of illustration in the accompanying drawings.

Figure 1 is a diagrammatic layout plan of an infra-red liquid analyser.

Figure 2 is a diagrammatic layout plan of an infra-red analyser using a non-selective detector.

Figure 5 is a side elevation of the interrupter 5.

Figure 6 is a cross-section of interrupter 5.

Figure 7 is a cross-section of a filter cell showing a balancing shutter, and

Figure 8 is a block diagram of the "on balance" arrangement.

Figure 3:
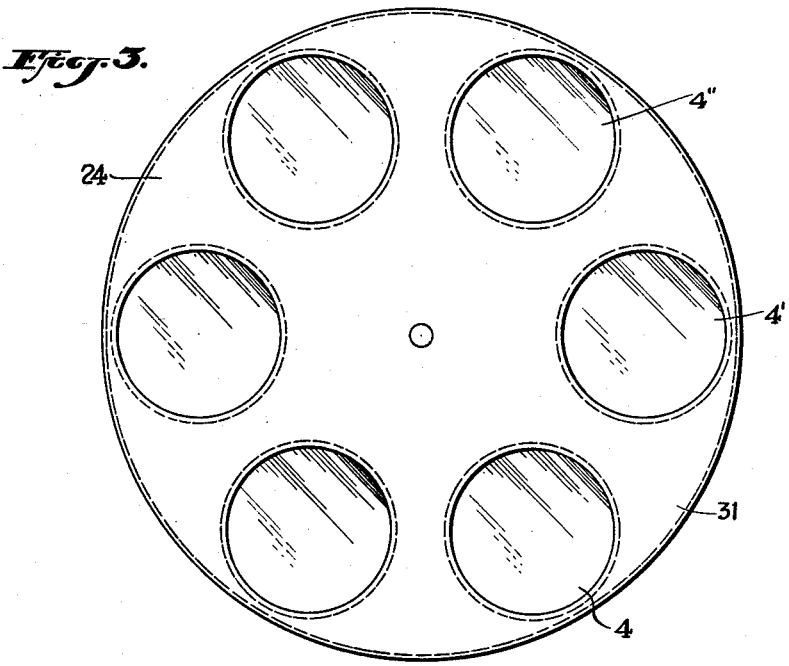
Figure 3 is a cross-section of filter unit 24.

The infra-red source 1 supplies radiation collimated into a beam by mirror 2. The beam of radiation passes through a cell 3, which may be of 1–3 mm. internal thickness, and into which may be passed the liquid to be analysed, a filter cell 4, similar to cell 3 and is then interrupted or chopped by chopping means 5. The chopping means 5 divides the beam of radiation into two equal alternately interrupted beams of radiation. The twin beams then pass through the twin cell 6 comprising two separate cells side by side arranged so that one beam passes through one cell and the other beam passes through the other cell. The two beams are then concentrated by the mirror 7 to the radiation detector 8. The filter 9 may be positioned anywhere in the collimated beam, and is shown here between the source and cell 3. The apparatus is positioned in thermostatically controlled box 19.

In operation, for example in the infra-red analysis of a liquid hydrocarbon, the infra-red source 1 is operated at a temperature such that the Nernst maximum lies in the wave length range 1.7 to 2.4μ. A germanium filter 9 is used which may comprise for example a sheet of germanium or a film of germanium of the appropriate thickness deposited on a sheet such as glass which is transparent in the wave length range used for the analysis. The cell 3 is filled with the hydrocarbon mixture to be analysed, the filter cell 4 is filled with the components of the hydrocarbon mixture except that component which it is desired to estimate. One half of the twin cell 6 is filled with the component to be estimated and the other half is filled with a standard or compensating fluid. The standard or compensating fluid may comprise suitable concentrations of the interfering components in a solvent that has no absorption bands in the wave length range being employed. The detector employed is suitably a lead sulphide detector. In this way the reading obtained from the detector is a measure of the content of the tested component in the mixture.

Where it is desired to analyse a multicomponent mixture for more than one component, the invention is also characterized in that one or more filter units are provided consisting of a support containing therein at least two filter cells, the support being rotatable about an axis, preferably substantially parallel to the beams of radiation; so that each filter cell may be brought alternately into position directly in line in said beams of radiation.

The filter unit preferably comprises a disc-shaped support, which is rotatable about an axis parallel to the direction of radiation of the apparatus, this disc-shaped support being provided with holes about the periphery, in which are fitted filter cells. The filter unit is rotated by a suitable mechanism such that a filter cell in the support can be rotated into position directly in line in the radiation beam, remain in this position for a fixed period of time, and thereafter the adjacent filter cell being rotated into the position directly in line in the radiation beam. Two or more of such filter units may be used in combination and may, if desired, be rigidly fixed to one another on the same axis so that any one filter cell in one unit is always associated with the same filter cell(s) in the other unit(s).

Modifications of this embodiment of the present invention are shown diagrammatically in the accompanying drawings, solely by way of illustration.

In Figure 2 a source of infra-red radiation 1 protected by screen 20 is reflected by the concave mirror 2 to give a beam of radiation. This beam of radiation passes through the filter 9 which transmits substantially only the desired wave lengths into the analysis absorption cell 3 containing the mixture to be analysed and then through the filter cell 4 contained in the filter unit 24. The beam of radiation is divided into two equal alternately interrupted beams of radiation by the rotating interrupter 5, one of said beams passing through one-half cell 6a (Fig. 4) of the test absorption/standard absorption double cell 6 contained in the filter unit 27 and is then concentrated by the mirror 7 on to the radiation detector 8 protected by a screen 30, the other of said beams passing the other half cell 6b (Fig. 4) of the test absorption/standard absorption double cell 6 and is then concentrated by the mirror 7 on to the radiation detector 8.

The filter unit 24 is shown in cross-section in Figure 3, and consists of a disc-shaped support 31 containing filter cells 4, 4', etc. disposed in the periphery thereof.

Figure 4:
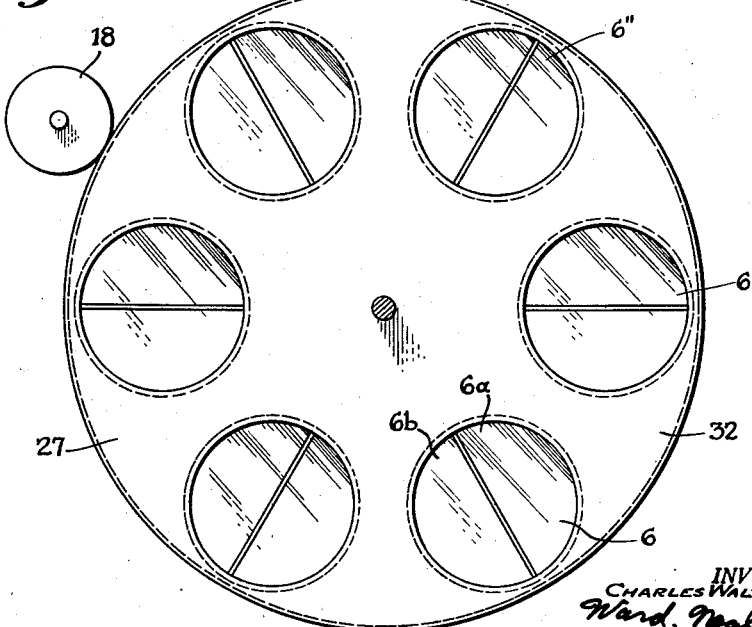
Figure 4 is a cross-section of filter unit 27.

The filter unit 27 is shown in cross-section in Figure 4, and consists of a disc-shaped support 32 containing double cells 6, 6' etc. The two filter units are mounted rigidly with respect to one another on a common shaft 33, and are provided with frictional drive means 18 operating against the side of one of the filter units. The parts of the filter units between the cells are made of material which prevents the passage of the beams of radiation when the filter cells are not in position.

The interrupter 5 is shown in side elevation in Figure 5 and in cross-section in Figure 6, and comprises a cylinder provided with two pairs of apertures 34, 34' and 35, 35'.

The apparatus requires to be set up in optical alignment for the satisfactory operation of the apparatus.

The filter units 24 and 27 are rotated discontinuously in order that each filter cell in filter unit 24 is rotated into position in line in the radiation beam, allowed to rest in this position for a suitable period of time, and then the adjacent filter cell rotated into that position, and simultaneously each test absorption/standard absorption double cell is rotated similarly into position in the radiation beam, the filter unit and the interrupter 5 being aligned so that one interrupted beam passes only through one half cell of said double cell whilst the other and equal interrupted beam passes only through the other half cell of said double cell.

In the operation of the apparatus according to Figure 2 for the analysis of a liquid containing six components A, B, C, D, E and F, the mixture containing six components is passed through the analysis absorption cell 3. One filter unit contains a set of six filter cells and the other contains a set of six test absorption/standard absorption double cells, each filter cell being paired with one of said double cells. The cells are mounted and aligned so that the two beams of infra-red radiation pass through the filter cell and then one of said beams passes through one compartment of the double cell, whilst the other beam passes through the other compartment of the double cell. Each filter cell is filled with a different combination of five of the components, and one compartment of the double cell associated with each filter cell is filled with the missing sixth component of the mixture (the test absorption half cell) and the other compartment of said double cell is filled with a standard or compensating fluid, which may comprise for example an independent fluid such as a mixture of two or more of the interfering components dissolved in a solvent which has no absorption bands in the wave length being used (the standard absorption half cell). The six mixtures filled into the filter cells comprise (1) B, C, D, E, F; (2) A, C, D, E, F; (3) A, B, D, E, F; (4) A, B, C, E, F; (5) A, B, C, D, F; (6) A, B, C, D, E, and the test absorption half cell associated with each mixture is filled with (1) A, (2) B, (3) C, (4) D, (5) E, (6) F, respectively, and in each case the reading obtained will be a measure of the content of the component present in the test absorption half cell of the mixture. Thus, referring to the drawing where the filter cell 4 contains a mixture A, B, C, D, E, and the test absorption half cell 6a contains F and the standard absorption half cell 6b contains the standard or compensating fluid, with the instrument aligned, the reading obtained gives a measure of the content of F in the mixture tested. In this way each component of the mixture may be determined in turn.

In the types of infra-red analysers illustrated, the relative position of the various parts of the apparatus is of no significance. It is, of course, essential that the absorption cells and each pair of filter cells are provided with some balancing means, such as a metal shutter, to ensure that they can be adjusted to have equal absorption characteristics prior to being employed for analysis, as in other types of infra-red absorption analysis instruments.

In Figure 7 is shown, in cross-section, an incomplete filter cell provided with a balancing shutter. The filter cell 36, with cell wall 37, and window 38 is shown attached to the collar 39 which is part of filter unit as described above. The collar 39 carries the bar 40 which rigidly supports the shutter carriage 41. The shutter 42 comprises a rod, tapering at one end, and threaded, the carriage 41 being also screw threaded throughout its length to receive the threaded portion of said rod. The shutter can be simply screwed in whatever position is desired, and locked in that position by the locking nuts 43 and 44.

The filter units may be provided with as many filter cells as is required, but in general the number of filter cells employed will correspond to the number of components of which it is required to determine the concentration, contained in the mixture to be analysed.

It should be noted that the filter unit containing more filter cells than it is required to use can be employed, merely by removing the filter cells which are not required.

The apparatus according to the present invention is of particular application for the analysis of multi-component fluids, where two or more of the components of the fluid absorb radiation in substantially the same wave length ranges.

The apparatus according to the present invention can be employed for the analysis of any mixture, provided that the components of the mixture are not such that the filter cell will filter out radiation of wave lengths corresponding to every absorption band in the component being measured.

The infra-red analyser may be used as an "off balance" instrument, that is the voltage generated at the detector unit used directly for indicating purposes, or alternatively the apparatus may be used as an "on balance" instrument, that is associated with a servo-type mechanism, for example where the generated voltage is used to operate means to drive a wedge or a comb into one of the beams of radiation to maintain the instrument on balance, the energy used by said driving means being employed to activate the indicating means.

Thus, for example, associated with the apparatus shown in Figure 2, a comb may be driven by a phase discriminating motor into the radiation beam which has passed through the standard absorption cell, the phase discriminating motor being responsive to the difference between, on the one hand, the phase of the amplified voltage generated at the detector and, on the other hand, the phase of the amplified voltage generated at a detector from an independent light source interrupted by means of a suitably placed additional pair of apertures provided in the cylindrical interrupter 5. By way of illustration, in Figure 8 is shown a block diagram of such an arrangement, which may be associated, for example, with the apparatus shown in Figure 2. The block diagram shows the radiation source 1 reflected by concave mirror 2 to give a parallel beam of radiation 47. The absorption and filter cells are not shown in the diagram, and the beam is split and interrupted by the interrupter 48 through the two pairs of apertures 34 and 35. A third pair of apertures 51 in the interrupter 48 serves to interrupt a beam of light from light source 52, received by the photo-cell 53 which provides the reference phase voltage. The beam of radiation 47 is concentrated by the concave mirror 7 on to the radiation detector 8. The error voltage from the radiation detector 8, and the reference phase voltage are both amplified and actuate the phase discriminating motor 56, which is mechanically coupled to the comb 57, which is driven in and out of the radiation beam 47, and to the recorder.

In addition to electro-mechanical systems, for instance as described above, for maintaining the instrument on balance, other systems, e.g. mechanical systems may also be used.

The radiation analyser may be employed for the analysis of fluids comprising either liquid-liquid mixtures or gas-liquid mixtures. An apparatus for radiation analysis, suitable for gas analysis, is described in our co-pending U.S. Patent No. 2,741,703, dated April 10, 1956.

I claim:

1. An infra-red radiation absorption analyzer for analyzing liquids which have a maximum infra-red energy absorption range above three $\mu$, comprising a source for providing infra-red radiation having wave-lengths substantially only in the range from 0.8 to 2.7$\mu$, a detector responsive to said radiation mounted in the path of said radiation for receiving and detecting said radiation, and a cell mounted in the path of said radiation between said source and said detector, said cell containing a liquid which has a maximum infra-red energy absorption range above three $\mu$ but which also absorbs the radiation from said source.

2. A radiation analyzer as set forth in claim 1 wherein said source includes a filter which transmits radiation having wave-lengths substantially only in the range from 0.8 to 2.7$\mu$.

3. A radiation analyzer as in claim 2 wherein said filter is a germanium layer filter.

4. A radiation analyser as set forth in claim 1 wherein said detector is selectively responsive substantially only in the wave-length range 0.8 to 2.7$\mu$.

5. A radiation analyzer as set forth in claim 1 wherein said detector is a lead sulphide detector.

6. An infra-red radiation absorption analyzer for analyzing liquids which have a maximum infra-red energy absorption range above three $\mu$, comprising a source for providing infra-red radiation having wave-lengths substantially only in the range from 0.8 to 2.7$\mu$, a detector responsive to said radiation mounted in the path of said radiation for receiving and detecting said radiation, and a cell mounted in the path of said radiation between said source and said detector, said cell containing a liquid which has a maximum infra-red energy absorption range above three $\mu$ but which also absorbs the radiation from said source, and said liquid having a thickness in the direction of said path of at least one millimeter whereby infra-red radiation having wave-lengths of at least three $\mu$ is substantially completely absorbed by said liquid and said detector is thereby substantially unaffected by said last-mentioned radiation.

7. An infra-red radiation absorption analyzer for analyzing liquids which have a maximum infra-red energy absorption range above three $\mu$, comprising a source for providing infra-red radiation having wave-lengths substantially only in the range from 0.8 to 2.7$\mu$, a detector responsive to said radiation mounted in the path of said radiation for receiving and detecting said radiation, and a plurality of cells mounted in the path of said radiation between said source and said detector, said cells containing a liquid which has a maximum infra-red energy absorption range above three $\mu$ but which also absorbs the radiation from said source.

References Cited in the file of this patent

UNITED STATES PATENTS

| | | |
|---|---|---|
| 2,376,311 | Hood | May 15, 1945 |
| 2,443,427 | Kidder et al. | June 15, 1948 |
| 2,570,064 | Meinert | Oct. 2, 1951 |
| 2,706,253 | Hutchins et al. | Apr. 12, 1955 |
| 2,729,143 | White | Jan. 3, 1956 |
| 2,741,703 | Munday | Apr. 10, 1956 |

OTHER REFERENCES

Journal of the Optical Society of America, 1947, vol. 37, pages 451 and 452; Hadley et al.